United States Patent [19]
Gründl et al.

[11] Patent Number: 5,723,933
[45] Date of Patent: Mar. 3, 1998

[54] ELECTRONICALLY COMMUTATED DC MACHINE

[75] Inventors: Andreas Gründl, München; Bernard Hoffmann, Starnberg; Reiner Rasch, Hechendorf, all of Germany

[73] Assignee: Orto Holding A.G., Luxembourg, Luxembourg

[21] Appl. No.: 427,369

[22] Filed: Apr. 26, 1995

[30] Foreign Application Priority Data

Apr. 26, 1994 [DE] Germany ............... 44 14 527.6

[51] Int. Cl.$^6$ ........................................ H02K 3/04
[52] U.S. Cl. ............................ 310/266; 310/208
[58] Field of Search .......................... 310/266, 179, 310/180, 213, 43, 201, 208

[56] References Cited

U.S. PATENT DOCUMENTS

| | | | |
|---|---|---|---|
| 4,080,543 | 3/1978 | Takahashi et al. | 310/213 |
| 4,260,924 | 4/1981 | Lugosi et al. | 310/213 |
| 4,278,905 | 7/1981 | Chari et al. | 310/52 |
| 4,763,053 | 8/1988 | Rabe | 318/254 |
| 5,331,244 | 7/1994 | Rabe | 310/180 |

FOREIGN PATENT DOCUMENTS 83 21 135.7  1/1985  Germany.

*Primary Examiner*—Steven L. Stephan
*Assistant Examiner*—Michael J. Wallace, Jr.
*Attorney, Agent, or Firm*—Pollock, Vande Sande & Priddy

[57] ABSTRACT

An electronically commutated DC machine, especially a DC motor, comprises a permanent magnet rotor providing a cylindrical air gap having a homogeneous magnetic field with straight, radially extending field lines and continuously alternating polarity. An iron-free stator means is formed like a self-supporting stator coil made of conductor material and cured synthetic resin comprises straight coil portions extending within the air gap. In order to provide machine, especially a motor, adapted for air cooling and providing a high current density, high-dynamic features and good overload capacity and further providing a behaviour essentially linear to the supplied current, the conductor material of each coil portion is consisting of one or several strand(s), wherein each strand comprises a number of thin filaments, being individually insulated, being arranged twisted within the strand and having a diameter equal or less than 0.4 mm. Said conductor material and liquid resin have been compacted in order to provide a stator coil comprising a content of conductor material of from 70 to 90% by volume.

25 Claims, 8 Drawing Sheets

ELECTRONICALLY COMMUTATED DC MACHINE

BACKGROUND OF THE INVENTION

The present invention is related to an electronically commutated DC machine, especially to an electronically commutated DC motor. Preferably, said DC motor is designed for a higher torque and power rating. Especially, said DC motor may be used as a driving motor for motor vehicles, especially passenger cars.

In the following the invention will be described with reference to an electronically commutated DC motor; however, this should not cause any limitation of the present invention.

The following documents DE 34 33 695 C2, EP 0 178 380 B1, U.S. Pat. No. 4,763,053 and U.S. Pat. No. 5,331,244 disclose an electronically commutated DC machine of similar construction. An essentially feature of said type of construction is an electrical machine comprising an iron-less stator means (so-called air coil). Contrary thereto, conventional electrical machines comprise a stator means having several electrically energized poles typically made of electric steel sheets. Grooves or slots are recessed within a specifically formed package of electric steel sheets, and the coil components for generating a magnetic field have been fixed in said grooves and slots. The arrangement of the coil windings within said grooves and slots provides for the necessary stability and solidity of the stator means. Contrary thereto, an iron-less stator means does not provide a similar supporting structure made of a package of electric steel sheets for attaching the coil windings.

The documents DE 34 33 695 C2, EP 0 178 380 B1 and U.S. Pat. No. 4,763,053 disclose a meander-like stator means comprising several insulated conductors including linear forward and backward extending meander sections and being obtained by preform winding such that each linear forward and backward extending meander section comprises a number of parallel conductor sections. The conductor sections may comprise cross-sectional areas which provide for a mechanically stable, self-supporting meander-like stator means even without any additional supporting structure. Said known meander-like stator means has been produced by preform winding. The stability and solidity of a stator coil obtained by preform winding may be increased by subsequent impregnation with liquid curable resin or by the use of so-called back-lacquer wires.

Further, said documents disclose an alternative stator means comprising a printed circuit, wherein a meander-like conductor array has been generated by conventional etching and/or depositing techniques; the meander-like strip array is supported by an inert electrically insulating substrate.

The document U.S. Pat. No. 5,331,244 discloses an air-core and meander-like stator means including linear forward or backward extending meander sections comprising a number of geometrically parallel and distantly arranged conductor sections having an essentially rectangular cross-sectional area. Said known conductor sections have been made of solid, self-supporting bars or sheets comprising the necessary stability and solidity even due to their cross-sectional areas. Said solid conductor sections comprise a rectangular cross-sectional area being arranged distantly such as to provide gaps between adjacent conductor sections, and cooling air may be forced to flow through said gaps.

The German Offenlegungsschrift 24 55 001 discloses a coil for an electrical rotating machine comprising an air-core stator means. The magnetic flux generated by the rotor means cuts directly the windings of the stator means. Therefore, large eddy currents will be induced within the surface area of the conductors of said windings. In order to reduce the losses caused by said eddy currents, the stator means shall comprise a number of combined strands wherein each strand consists of a number of thin insulated wires. Due to their fineness, the thin wires are difficult to handle. In order to provide more stability, the thin wires within each strand are twisted. Due to the twisted arrangement, each strand performs as a rather loose wound coil wherein the changing magnetic flux of the rotor will induce a current which will cause a magnetic flux within the strand. In order to overcome this problem, said document discloses a stator means for a slotless rotating electrical machine having a magnetically active air gap wherein a number of coil components are attached and supported on an inner circumferential face of a magnetic core defining said air gap. According to a specific feature, each coil component comprises several strands consisting of a number of insulated thin wires or filaments, wherein the strands of adjacent coil components being twisted in an opposite direction. The problem of the insufficient mechanical stability and solidity of a stator means consisting of thin wires shall be overcome by a twisted arrangement of said wires and by supporting the stator means on the inner circumferential face of a stationary arranged magnetic return circuit material. Said document does not disclose a self-supporting plunger coil. Further, there is no mentioning of an obtainable copper factor, this means the content of conductive material, within the known stator means.

The British Patent Specification 1 465 984 discloses a stator means for an electrical machine, wherein the stator means being formed like an air-core coil which is supported on a smooth slot-less inner circumferential face of a stator core made of magnetic return circuit material. In order to reduce the losses caused by eddy currents as far as possible, the stator means shall comprise a number of strands, wherein each strand consists of a number of thin wires or filaments having a diameter of 1 mm or less. There is a problem of fastening and supporting those thin wires on the smooth face of the stator core. Further, there is the problem of an effective cooling of said strands, especially of the strands arranged inside of the stator means. In order to overcome said problems, a cage made of cooling pipes is provided, preferably a double-wall cage. The strands of the stator coil being arranged within said cage and being fastened and secured by means of cured resin. According to this document the stator means comprising a cooling cage arrangement is supported on the inner circumferential wall of the stator core. Therefore, the document does not disclose a self-supporting plunger coil. The space necessary for the cooling pipes decreases the copper factor of the complete arrangement.

The German Utility Model Specification 83 21 135 discloses an electrical conductor, which may be used for transformer means, choke means and high-performance magnets. The known conductors comprise a twisted structure and consist especially of six twisted elements without a central core, wherein each single element being made of insulated wires or filaments or of strands being made of insulated wires. For example, each strand may comprise 50 to 150 circular insulated wires. Each individual wire may comprise an electrically effective insulation and may comprise a copper diameter of from 0.2 to 2.0 min. Preferably, the complete conductor has been deformed in order to obtain a rectangular or square cross-sectional area. It may easily be calculated that a known conductor of said kind having a square cross-sectional area and consisting of wires having a copper diameter of 0.2 mm being covered by a 25 μm thick envelope of insulation may comprise under optimal, idealized conditions a maximum copper factor of about 50% by volume. In practical experience, the copper factor of those strands is much smaller and is conventionally less than 30% by volume. When using those strands for manufacturing a stator coil which is to be arranged within an iron-less magnetically active air gap of an electrical machine, there is again the technical problem, how to provide a self-supporting mechanically stable stator coil consisting of those thin and flexible wires or filaments, especially in order to obtain a plunger coil being clamped only at one end of said coil.

During the research work preceeding the present invention, a prototype of an electronically commutated DC motor has been constructed as described in detail in U.S. Pat. No. 5,331,244. (15 permanent magnet pole couples made of Sm/Co sinter material, rotor diameter of about 300 mm, meander-like stator coil made of solid copper bars having a cross-sectional area of 5×2 mm). This prototype motor has been examined on a test stand. At a rotational speed higher than about 1200 rpm the rotating permanent magnets of the rotor induced in a significant and increasing amount eddy currents within the solid copper bars. Said eddy currents caused significant losses in torque and power rating and limitated the usable rotational speed of said prototype motor. As a consequence, the construction as described in U.S. Pat. No. 5,331,244 is of limited value. The performance data as described in said documents, especially a power rating to about 100 kW as said in said document, could not be verified.

On the other hand it would look very promising to develop a rather simply designed high-performance machine according to the known constructive principle and comprising a permanent magnet excitation as far as the limitations with respect to rotational speed, power rating, torque and performance of the known machine as proved in practical use could be overcome.

SUMMARY OF THE INVENTION

Starting therefrom it is an object of the present invention to provide an electronically commutated DC machine, especially an electronically commutated DC motor following still the general known constructive principle as disclosed with the documents U.S. Pat. No. 4,763,053 and U.S. Pat. No. 5,331,244 and allowing cooling with cooling air, but comprising a high current density, further high dynamic features, a good overload capability and an essentially linear behaviour of torque and rotational speed with respect to voltage and current supplied; this means, extraordinary losses (for example losses due to eddy currents or degree of saturation) in dependence of rotational speed and/or torque should essentially be avoided.

According to the present invention an electronically commutated DC machine, especially an electronically commutated DC motor is provided, comprising a rotational axis, a permanent magnet rotor having an even number of permanent magnet poles, arranged in a constant pole pitch and for rotating along a cylindrical air gap and generating within said air gap a homogeneous magnetic field with linear and radially extending magnetic field lines and with a continuously changing polarity, an iron-free (air-core) stator means including a self-supporting stator coil consisting of conductor material and cured synthetic resin and comprising straight coil portions arranged parallel to the rotational axis and extending within the air gap, wherein each coil portion comprises only one distinctive current direction at a given moment, and wherein each coil portion comprises a traverse width (dimension in circumferential direction) corresponding with the pole pitch of the permanent magnet rotor, wherein the conductor material of each coil portion is consisting of one or several strands, wherein each strand comprises a number of thin filaments being individually insulated, being arranged twisted within the strand and having a copper diameter equal or less than 0.4 mm; and wherein said conductor material and liquid resin have been compacted in order to provide a stator coil comprising a content of conductor material (copper factor) of from 70 to 90% by volume.

According to a preferred aspect of the present invention said stator coil is formed like a compact, dense flat coil.

Surprisingly, this combination of features provides a stator means for a DC machine, especially for a DC motor characterized by an essentially linear behaviour of torque and rotational speed with respect to voltage and current supplied. Extraordinary losses, for example losses due to eddy currents or saturation in dependence of rotational speed and/or torque do practically not occur. This result is a confirmation that the overload capability of the machine/of the motor is essentially defined by thermal factors. The dynamic performance is extraordinary good; practically under all load conditions a rotational speed of 300 rpm and more will be obtained within a running-up sequence of a few seconds. The obtainable current densities are surprisingly high. For example, current densities of about 10 Ampere/$mm^2$ may be obtained for a permanent duration. Surprisingly and despite said high current densities a permanent power rating of about 20 kW may be controlled by air cooling. With other, conventional high-performance machines of low weight, for example electric generators for aircrafts, similar current densities may be obtained solely with a direct liquid cooling, for example with an oil spray cooling.

Further, a stator coil according to the present invention provides the necessary mechanical stability, solidity and strength in order to enable a plunger coil, which is clamped or fastened at one coil end and which extends unsupported with significant dimensions into a magnetically active air gap being defined on both sides by rotatably arranged permanent magnets. Surprisingly and despite the low copper diameter of the filaments, this high stability may be obtained with an extraordinarily low amount of cured resin, especially so-called structure resin. The resin amount of about 10 to 30% by volume, preferably of about 10 to 20% by volume referring to the volume of the stator means has practically no effect onto the thermal conduction within the stator coil and onto the heat transmission at the surface of the stator coil. Referring to the weight of the stator coil, an extraordinarily high copper factor (content of conductor material) may be obtained.

The strands as used for manufacturing a stator coil according to the present invention are known per se and may be obtained commercially. For example, a suited strand may be obtained from the company ROLL ISOLA, CH-4226 Breitenbach, Switzerland. A suited strand is consisting of a high number of thin wires or filaments being individually insulated. These filaments comprise a copper diameter equal or less 0.4 mm. In case of a filament diameter higher than 0.4 mm, extraordinary losses (due to eddy currents) being depending of the rotational speed and/or the torque will be observed in an increasing amount. In case of a filament diameter less than 0.1 mm, difficulties in handling the strands for obtaining coil portions of definite shape will be observed increasingly. Good results have been obtained with filaments comprising a copper diameter of about 0.2 to 0.3 mm; strands comprising such filaments will be used preferably.

Within a given strand the thin wires or filaments forming said strand comprise a twisted arrangement. Preferably, there is at least one complete twist of the filaments within said length of a coil portion extending within the air gap. This provides that in average all filaments are subjected to the same induction factors; this means, in average all filaments are loaded with the same partial currents. An especially preferred kind of twisting is the conventional transposed conductor arrangement (Roebelstab) of filaments within the strand.

Further, the stator coil according to the present invention comprises a conductor material content or copper content (equal to copper factor), respectively, of about 70 to 90% by volume. Preferably, said copper content amounts at least 80 to 90% by volume. In addition to these specific coil portions forming the stator coil, the stator means may contain other portions, for example a single-piece formed crown portion and/or foot portion made of fiber enforced resin, which portions are essentially free of conductive material. The stator coil per se is formed like a compact, dense, press-compacted flat coil, which does not comprise any gaps for passing cooling air. Provided that the copper content is less than about 70% by volume, then the desired high performance and power rating may be not obtained. Further, an effective heat transmission and heat elimination cannot be obtained, which is a pre-requisite for an air cooling. Provided that the copper content is higher than 90% by volume, then the necessary mechanical stability and strength may not be obtained, which is a pre-requisite for a plunger coil being clamped at one coil end and extending with a significant coil dimension into the air gap. A higher copper factor provides good results in two directions. First, the same current will generate lower Ohmic losses (the Ohmic losses behave reciprocal to the copper factor); alternatively, the same acceptable losses enable a higher current. Second, a higher filling factor, or copper factor, respectively, (especially with the thermic well conducting copper) increases drastically the thermal conduction within the stator coil. In order to obtain a high copper factor, the strand will preferably be press-compacted and will be maintained under mechanical pressure during the impregnation and infiltration of liquid resin and curing of said resin. For example, observing these conditions will provide a content of conductor material within the stator coil or copper factor, respectively, of about 85% by volume.

For example, a strand made up of a high number of thin filaments comprises per 1 $mm^2$ cross-sectional area in dependence of the filament diameter at least about 10 to 50 filaments. In case of a filament diameter of about 0.2 to 0.3 mm, then 1 $mm^2$ strand cross-sectional area contains preferably about 20 to 40 filaments.

According to experimental results, a DC motor according to the present invention and equipped with a fore-mentioned stator coil provides a current density within the stator coil of about 10 Ampere/$mm^2$; in addition, the temperature of said DC motor could be controlled solely by air cooling. In addition, the extraordinary losses could be reduced by about 80% with respect to a similar designed motor according to U.S. Pat. No. 5,331,244, but comprising a stator means made of solid copper bars. This means, the present invention allows to provide a DC motor based on said constructive principles as described in U.S. Pat. Nos. 4,763,053 and 5,331,244 which is outstandingly suited as driving motor for vehicles. The motor according to the present invention is especially characterized by a high dynamic performance, by a good efficiency even in a partial load mode, and by the absence of electrodynamic limitations.

According to a preferred aspect of the present invention, the stator coil is formed like a compact, dense, press-compacted flat coil. This flat coil may be formed to a one-piece closed ring or may form several segments yielding (if necessary by inclusion of phase displacement or phase shifting pieces) a closed ring or yielding a ring segment. The iron-less stator means provides the advantage that a motor may comprise only a partial assembling with stator segments. In contrary thereto, a partial assembling with stator segments of a conventional motor comprising iron-based electromagnets would provide difficulties, because the magnetic flux could not be closed in the end portions or head pieces. In a similar approach, the present invention allows a partial assembling of the rotor or armature, respectively, with magnet segments. For special requirement, a DC machine, especially a DC motor, according to the present invention may comprise a partial assembling (this means a gradiated circle-like embodiment) of the stator means and/or of the rotor means. In any case, the stator coil as provided with the present invention comprises dimensions, such that the closed ring or the ring segment may be axially introduced into the air gap at least with the straight coil portions. A one-piece closed ring comprises higher strength. The manufacture of a composite ring being composed of several ring segments requires lower costs for molds. An axial introduction of the completely assembled stator coil into the air gap at the rotor decreases the costs of manufacture.

According to a further preferred aspect of the present invention, the stator coil is formed and arranged like a plunger coil being clamped at one end and extending into the air gap which is defined on one side by rotatably arranged permanent magnets and which is defined on the opposite side by permanent magnet material and/or by magnetically conductive material for closing a magnetic flux circle, in short: "magnetic return circuit material". An especially high air gap induction and thereto an especially high power rating will be obtained when the stator is extending like a plunger coil into an air gap which is defined on both sides by aligned permanent magnet poles comprising the same polarity. An essentially homogeneous magnetic field will be obtained comprising linear radially extending field lines. Preferably, the permanent magnet poles are formed like single pole pieces being fastened or sticked, each on an outer ring and an inner ring, both made of magnetic return circuit material. A connection by fastening with adhesive at the inner ring will be stressed under tension due to the centrifugal forces. Even when the permanent magnets attached to the inner ring being additionally secured by a band made of ultra strength fibers or threads, then the fastening by adhesive limitates the mode of uses with respect to rotational speed and/or temperature. Provided that a high rotational speed (number of revolutions) of 4000 rpm or more is required, then it might be more advantageous to arrange the permanent magnet poles having an increased thickness (dimension in radial direction) solely at the outer ring, and to close the magnetic field line flux by an inner ring made of magnetic return circuit material. In this case, the inner ring may be arranged for synchronous rotation with the permanent magnet rotor, or a stationary arrangement may be provided for said inner ring. Preferably, a stationary inner ring will be made of iron material wherein eddy currents may not be induced easily, for example iron material in form of sheets or powder dispersed within a resin matrix. In case of a stationary arranged inner return circuit ring, one has to accept some magnetic leakage, but advantages may be obtained with respect to the mechanics. In addition, the stator coil may be supported in some points or sections on a stationary arranged inner return circuit ring, provided that there remains sufficient unrestricted surface of the stator coil in order to allow an air cooling.

According to a further preferred aspect of the present invention, the rotor may be formed and arranged like an open bell type armature construction comprising a plate preferably made of a non-metallic material and further comprising an inner ring (inner bell) and distantly thereto an outer ring (outer bell). Both, the inner ring and the outer ring being made of magnetic return circuit material. The inner ring comprises an outer circumferential face being covered with permanent magnet material forming permanent magnet poles. The outer ring comprises an inner circumferential face being covered with permanent magnet material forming permanent magnet poles. The outer ring comprises an inner circumferential face being covered with permanent magnet material forming permanent magnet poles. Both, the permanent magnet poles on the inner ring and the permanent magnet poles on the outer ring being arranged in alignment with each other, and aligned permanent magnet poles being polarized radially and comprising the same polarity. Both, adjacent permanent magnet poles on the inner ring and adjacent permanent magnet poles on the outer ring being polarized alternating. The magnetically active air gap being formed between said permanent magnet poles on the inner ring and on the outer ring.

Additionally provided that the permanent magnet poles being made of a highly coercive magnet material, for example such as Sm/Co or Fe/Nd/B, then such a bell construction may provide a very homogeneous magnetic field comprising radially extending field lines and an especially high magnetic flux density. For example, an air gap induction of about 0.64 Tesla has been measured within an about 6 mm width (dimension in radial direction) air gap being defined on both sides by about 7 mm thick flat magnets consisting of Sm/Co material. For mechanically easily controllable rotational numbers to about 3500 rpm (with an air gap diameter of about 300 mm), it is preferred to use said bell-type rotor construction wherein the air gap being defined on both sides by permanent magnet material.

With respect to the stated dimensions, both, the inner ring and the outer ring may preferably comprise a length (dimension in axial direction) of about 50 to 100 mm. With a ring length of significantly more than 100 mm the bell only clamped at one end starts increasingly to vibrate which requires higher tolerances of the dimensions of the air gap. In addition, a creation of noise increases significantly. With a ring length less than 50 mm the air gap face is unnecessarily limited, and a high power rating cannot be obtained.

Preferably, the permanent magnets form single pieces of magnet material being attached by adhesive to a support made of magnetically conductive material. For example, a suited magnetically conductive material is St 54, a carbon containing iron alloy comprising high magnetic conductivity. The dimensions of the permanent magnets depend of the air gap diameter and of the pole pitch. In case of a rotor diameter of about 250 to 300 mm, piece-like permanent magnets may be provided having a length of about 50 to 100 mm, a width of about 20 to 40 mm and a thickness of about 5 to 10 min. Preferably, a gap or distance being provided between two adjacent permanent magnets on a ring. Said gap or distance provides a non-polarized or neutral zone, which decreases the magnetic leakage. Preferably, the width (dimension in circumferential direction) of said neutral zones corresponds essentially to the radial dimension of the air gap. In this case, a minimum of magnetic leakage and an especially high coverage of the rotor circumferential face(s) with magnetic material may be obtained.

Provided that the DC machine shall be operated at an especially high rotational speed, for example with 6000 to 7000 rpm, then it may be additionally provided to divide the piece-like permanent magnets into single bars or segments having a reduced cross-sectional area which causes a reduced induction of eddy currents. For example, prefabricated magnets may be submerged within a liquid and may be treated with a diamond saw in order to cut thin grooves which will be filled with artificial resin subsequently. Such segmented permanent magnets allow a reduction of the reactive power at very high numbers of rotation.

Further, with a bell-type rotor as stated above, the permanent magnets attached by adhesive at the inner ring and operationally stressed by tension may be additionally secured by a band. Said band may be made of fibers or threads consisting of an ultra strength material being heat-resisting and creep-resisting. Suited materials including glass, selected artificial polymers such as "Kevlar", "Aramide" and polymer carbon so-called "Polycarbon". The band shall comprise a thickness as low as possible, preferably less than 1.0 mm, in order to decrease the air gap induction not unnecessary. Such a band allows a higher rotational speed and a higher operational temperature with a given attachment by adhesive.

As already stated above, a stator coil according to the present invention may be formed like a compact, dense flat coil having the shape of a one-piece closed ring or the shape of one or more ring segments. Both, the closed ring or the ring segments comprise an outer circumferential face and an inner circumferential face. Preferably, axially extending grooves being embossed into said outer circumferential face and/or into said inner circumferential face.

Said grooves enlarge the surface of the flat coil and increase the heat transmission out of the coil into the surrounding medium which is especially important for an air cooling. Said grooves provide channels or flow passages for an enforced cooling air flow. Surprisingly, a stator coil being formed like a flat coil and comprising the features according to the present invention (please see claim 1) enables a sufficient air cooling even when providing high power ratings. Practical experience has proved that a sufficient heat elimination may be provided even without gaps in the stator coil. Because the weight content of cured resin within the stator coil is very low, the thermal characteristics of the coil including the heat transmission from coil to air is in first instance controlled by the copper content of the coil.

Thereto and according to another preferred aspect of the present invention, a cooling action of the DC machine being provided by a forced flow of cooling air flowing along the outer circumferential face and along the inner circumferential face of the stator coil. Preferably, said cooling air will be introduced into the air gap through a number of passages arranged in regular distances to each other and being recessed within the inner ring adjacent to the bell plate. Preferably there is a forced flow of cooling air which may be generated independently of the rotational speed of the rotor. The independent generation of the cooling air is important because a motor of this kind may provide the full power and torque by very low numbers of rotation, even in a stop mode. A parallel flow of the cooling air along the outer circumferential face and along the inner circumferential face of the stator coil decreases the necessary pressure drop. Due to the relatively large cross-sectional areas of the flow passages and due to the relative short length of the flow passages, the required power rating of a cooling fan is relatively low.

According to another preferred aspect of the present invention the permanent magnet rotor comprises one or more circumferential face(s) defining the air gap, and said face(s) being free of slots, grooves, recesses and the like. The resulting smooth faces decrease the generation of noise by the running machine and increase the cooling performance of the air cooling. In order to provide smooth circumferential faces of the rotor, the necessary distances or gaps between adjacent piece-like permanent magnets in order to provide neutral zones may be filled with artificial resin.

As already stated and according to a further preferred aspect of the present invention, the stator coil is formed and arranged like a plunger coil clamped at one end extending into the air gap which is defined on both sides by rotatably arranged permanent magnet poles. Preferably, this stator coil comprises a thickness (dimension in radial direction) of about 5 to 10 mm. A thickness in this range provides the necessary mechanical stability and strength, which is required for a plunger coil clamped at one end. In addition, a sufficient air gap induction may be obtained which may reach about 0.6 Tesla. Due to the thin construction of the stator, an air cooling is sufficient and allows to keep the operating temperature in average between about 120° and 150° C.

According to another preferred aspect of the present invention, the stator coil comprises straight coil portions preferably consisting of several strands, wherein each strand comprises a rectangular cross-sectional area, and wherein the longer side of the strand cross-sectional area being arranged parallel to the direction of the magnetic field lines within the air gap. A rectangular cross-sectional area of the strands provides for a higher copper factor. In addition, this form of a strand facilitates the forming of the winding heads, because the smaller strand cross-sectional dimension may be easier matched to a relatively small radius of curvature.

Within the content of this document "coil portion" means a number of conductor portions (filaments and/or strands) being arranged among each other geometrically parallel and being arranged altogether parallel to the rotational axis. At a given time moment only one direction of current flow occurs within all conductor portions of a coil portion. An electric pole of the stator coil may be formed of several adjacent coil portions provided that the same direction of Current flow occurs in all the coil portions of a pole at a given time moment. Independently of an eventually provided phase displacement, the pole pitch of the stator coil is similar to the pole pitch of the magnetic poles on the rotor. The traverse width (dimension in circumferential direction) of the coil portion "corresponds" in so far with the pole pitch of the permanent magnet poles as said width amounts essentially (or a little less) 1/1, 1/2, 1/3, 1/4, . . . 1/n of the pole pitch of the permanent magnet poles; in this case, an electrical pole is formed of 1 or 2 or 3 or 4 or n adjacent coil portions (wherein "n" is an integer natural number).

There are several possibilities of forming the stator coil with respect to winding techniques. The fore-mentioned prior art discloses a strict meander-like conductive strip array for the stator coil. Such a meander-like conductor arrangement may be used for the stator coil according to the present invention. In this case, the straight coil portions will be formed by the straight or linear meander sections. At a given time moment the current will flow in a forward extending meander section in one direction, and the same current will flow in the adjacent backward extending meander section in the opposite direction. Provided that only one coil being provided per phase, then one meander section forms one electric pole, and the traverse width of a meander section corresponds to the pole pitch of the permanent magnet poles, because the stator coil according to the present invention forms a dense, closed flat coil (disregarding phase displacement pieces).

Preferably, the stator coil being made of several windings connected in series, wherein each winding being wound of one piece of strand, and wherein each winding comprises two winding arms. The two arms of a winding being arranged distantly to each other and forming a gap between each other; the winding arm of the next following (tandem arranged) winding being inserted into said gap. Each winding arm comprises a travers width, which is essentially similar to the half pole width of the permanent magnet poles. The wiring mode of the windings and the current flow within the windings is such that the current will flow in the same direction through each two adjacent winding arms belonging to two different adjacent windings. In this case, each winding arm forms a straight coil portion of the stator coil, and an electric pole of the stator coil is consisting of two adjacent coil portions.

This type of wiring mode is preferred and provides the same advantageous electromagnetic effects as a meander-like wiring of a stator coil. However, the expenditure of manufacture and the length of the magnetically non-effective winding heads is much smaller than the expenditure and the winding heads of a meander-like stator coil.

With this type of winding mode, a preferred stator coil comprises straight coil portions having a traverse width (dimension in circumferential direction) being essentially equal to the half pole width of the permanent magnet poles, and the current will flow through each two adjacent coil portions in the same direction, thus that said two adjacent coil portions form one electric pole.

Alternatively and eventually resulting from another winding technique, a stator coil may be provided comprising electric poles which consist of three or four or more adjacent coil portions; in said case, the traverse width of a coil portion amounts 1/3 or 1/4 or 1/n of the pole pitch of the permanent magnet poles.

According to the present invention the stator coil is consisting—per electric phase—of a compact, dense, closed flat coil, having an extension in circumferential direction which corresponds to a distinctive ring segment, for example 180° or 120° or 90°. In this case it cannot be avoided that during the duration of a current flow in one direction, not the complete number of conductors or filaments, respectively, of an electric pole contribute for generating the electromagnetic force. According to another preferred aspect of the present invention, compensation may be obtained in so far that in the motor mode of the machine a sinus-shaped current will be supplied having a shape which is matched to the voltage, which will be induced within the stator coil by the rotating permanent magnet poles. This induced voltage is inter alia depending on the relative coverage of the rotor circumference with magnetic material (considering the neutral zones) and further depending of the arrangement and matching of the coil portions of the stator coil to this permanent magnet arrangement and coverage. An optimum load factor, especially with respect to the efficiency may be obtained by supplying a matched sinus-shaped current. In any case, the present invention provides a significant higher power rating in comparison with the known solid bar winding (as known from U.S. Pat. No. 5,331,244) the accumulated traverse width of the copper bars per electric pole amounts less than 1/2 of the pole width of the permanent magnet poles thereof.

The straight coil portions extend with a certain length (dimension in axial direction) into the air gap. This length of the coil portions is depending of the length of the air gap. Preferably, this length of the coil portions amounts to about 50 to 100 mm, for example with a rotor comprising an air gap diameter of about 300 mm.

As known per se, in tandem arranged coil portions being connected with each other via an upper winding head or via a lower winding head. Preferably, at least the upper winding heads extend with respect to direction and thickness within an imaginary extension of the coil portions, such that the completely assembled stator coil may be axially introduced into the cylindrical air gap of a given permanent rotor. This kind of axially introduction may be performed rather easily, because the stator means do not contain iron, which otherwise would be strongly effected by the permanent magnets of the rotor. According to the present invention, the expediture of assembling the DC machine is decreased.

According to another preferred aspect of the present invention, the upper winding heads, this means the winding heads distantly arranged to the supporting means of the stator coil, being embedded within a crown portion made of fiber enforced resin. Preferably, the artificial resin may be enforced with glass fibers. Preferably said artificial resin may be the same structure resin, which has been used for filling and stiffening the stator coil. Such a crown portion increases the mechanical stability and strength of the stator means. If required, the crown portion may additionally comprise a band made of ultra strength fibers or threads. Especially said band is suited to hinder a deforming, especially a trumpet-like expansion of the stator ring during a heating step and due to the different thermal expansion coefficiences of copper and cured resin.

According to another preferred aspect of the present invention, the lower winding heads may be embedded within a foot portion made of fiber enforced resin. The stator means may be attached and centered with a motor supporting plate by means of said foot portion. The foot portion may comprise bores extending radially and/or axially in regular distances to each other. Mounting pins or bolts may extend through said bores. The radially extending mounting bolts may be used for an attachment of the stator coil to a collar or shoulder of the supporting plate. The axially extending mounting bolts may be used for an azimuthal aligning of the straight coil portions and of the upper winding heads. Additionally, the foot portion may be secured by means of a chucking or clamping ring. These fastening means provide a reliable, strength and solid clamping of a plunger coil.

According to another preferred aspect of the present invention, a number of adjacent straight coil portions being combined to a coil segment, comprising a constant pole pitch and forming one electric phase. At least two coil segments of said kind are arranged at the same circumference, wherein one coil segment is arranged electrically phase displaced with respect to the other coil segment. This provides a self-starting DC motor from any rotor position. Further, the synchronous running characteristics of the motor will be increased. Preferably, the complete stator means comprises a first, a second and a third coil segment, each having an extension of about 120°. The first coil segment takes a given position. The second coil segment being arranged phase displaced in an amount of +2/3 of the pole pitch with respect to said first coil segment. The third coil segment being arranged phase displaced in an amount of −2/3 of the pole pitch with respect to said first coil segment. The complete motor provides a three-phase force or power activity, which is very advantageous. Alternatively, the ring-shaped stator means may comprise four or more electrically separated phases. The construction according to the present invention facilitates the separation of the stator means into several electric phases, because an electric coil coupling is restricted to adjacent coil ends and the amount of said coil coupling is very low.

The manufacture of a stator means according to the present invention may be essentially effected in a conventional manner known in the art. The equipment requires a splitable mold, which may be heated and evacuated and which comprises a mold cavity which is matched to the contour of the stator means. In a laboratory scale it is preferred to assemble the complete stator means from single segments. In this case, the equipment requires a mold which is suited to manufacture a single segment of the stator means. In an industrial scale it is preferred to manufacture the complete stator means like a one-piece closed ring or like a one-piece ring segment, and a suited mold has to be provided. A strand will be provided consisting of a large number of individually insulated filaments. Said strand will be used to prepare a pre-winding by means of a winding machine. The shape of said pre-winding will be provisional fixed by means of filament glass yarn. The final stator coil may comprise one or more pre-windings. The pre-winding (s) will be arranged within the mold by means of alignment pins. Those portions within the mold provided for the crown portion and the foot portion of the stator coil will be filled with enforcing glass fibers. If required, a pre-fabricated band made of ultra strength fibers or threads may be inserted into the crown area. Thereafter, the mold will be closed and sealed pressure-tight, whereby a moderate mechanical pressure will be exercised onto the pre-winding(s). The mold will be heated for purposes of drying and of temperature equalisation. In a parallel step, the given structure resin comprising high creep flow properties will be mixed, made air-free and heated. The temperature equalized mold will be evacuated. The obtained vacuum will be broken by means of the heated liquid air-free resin. Thereafter the liquid resin will be pressed into the mold by means of increased pressure. Thereafter the content of the mold may be cured maintaining the mold within an oven at normal pressure. Thereafter, the mold is cooled slowly. Thereafter, the splitable mold will be opened, and the stator means or the stator means segment will be removed from the mold and will be cleaned. Thereafter, the connections will be freed from insulation material, will be etched, shaped and prepared for a soldering step.

An electronically commutated DC machine of the present kind requires an acurate working pole position detecting means in order to control the currents supplied to the stator coil synchronously with the instantaneous magnet positions of the rotor. With an exemplary machine comprising a rotor having 15 pole couples, the current flowing through the stator coil has to change its direction 15 times per one rotor revolution. With numbers of revolution of about 3000 to 6000 rpm, the current requires a frequency of 750 to 1500 Hz. Related to electromotors, this relatively high frequency is an essential reason for the high power yield of the present motor concept. Contrary to conventional motor concepts, the present motor concept does not provide for an iron circle, which would require magnetic reversal with said frequency, which would cause high losses. Therefore, a DC motor according to the present invention is especially suited for said high frequencies. In order to control the high basic frequency of about 750 to 1500 Hz, the high-end working frequency of the pole position detecting means shall amount at least about 100 kHz. Preferably, a resolver will be used for the pole position detecting in this area. Principally, a resolver is a kind of transformator wherein a coupling between the primary winding and the secondary winding may be varied continuously between the values +1 and −1 by mere mechanical torsion. For example, this kind of transformator may be fed with a frequency of about 20 kHz, and by comparison of the induced voltage, the position of the resolver may be ascertained quickly and very precisely. In the present case, the primary winding of the resolver rotates synchronously with the permanent magnet rotor, and in a short distance thereto the secondary winding is attached at a supporting plate supporting in addition the stator means. The use of a resolver provides the additional advantage, that the pole position detecting does not require active electronic components. Further, it is helpful to look for a space-saving construction and arrangement of the resolver, such that the essentially empty inner space of the machine will be available for other purposes, for example for the installation of a reducing gear in case when the machine shall be used as a DC motor for driving a wheel of a passenger car.

When the machine shall be used in the motor mode, this means as an electronically commutated DC motor, then the current supply is effected by means of a current inverter. Preferably, an inverter may be used being designed for a pulse wide modulation. Depending of the availability of suited components, the motor may be optionally connected in a star connected three phase system to a three phase current inverter or alternatively, connected to three one-phase inverters, comprising a phase displacement of 120° against each other (in connection with a suited three-phase stator coil). In case of a motor comprising a rotor having 15 pole couples and being driven at a nominal rotational speed of 3000 rpm, then the current supply has to be effected at least with a frequency of 750 Hz; higher numbers of revolution require higher frequencies until about 1500 to 2000 Hz.

According to a further preferred aspect of the present invention and in the motor mode of the present machine, each phase of the stator coil shall be supplied by at least one or several related inverter(s). In this case, smaller and less expensive inverter means may be used for the current supply. Further, the redundancy is improved, because in case of a failure of one inverter, the other inverters remain operable, and the motor remains ready for service.

Typically, a DC voltage of about 200 to 400 Volt being required; however, even higher voltages of about 600 to 800 Volt seem to be appropriate. The current inverter shall be suited to provide sinus-shaped currents, in order to maintain the losses and the noise as low as possible. Further, it is absolutely necessary that the inverter shall be suited for a high-frequency clocking, for example with a frequency equal or higher than 20 kHz, in order to provide a possibility to control the current supply, because the motor comprises an extremely low inductivity due to the specific motor concept. Further, the inverter shall comprise a control means, which enables in reference to a given pole position signal stating the accurate rotor position and being preferably generated by a resolver, to generate a sinus-shaped current, controlled with respect to amplitude and phase and to impress said voltage/current into the stator coil(s). Further, it is helpful when the control means of the inverter is suited to change the controlling mode at high numbers of revolution, such that the phase of current and voltage will be shifted with each other in order to provide a field weaking area. In case when the motor being subjected by a braking moment or braking torque, then the control mode of the inverter has to be changed to a return supply mode, and the return or negatively fed energy will preferably be fed to an accumulator means. Along with all other permanently energized driving machines, the inverter has to be secured at its outlet against voltages, which may be provided by the motor in a "field weaking area" or at overspeed of the motor.

In the following the invention will be explained in more detail with reference to a preferred embodiment and referring to the accompanying drawings.

DESCRIPTION OF THE PREFERRED EMBODIMENT

Figure 1:
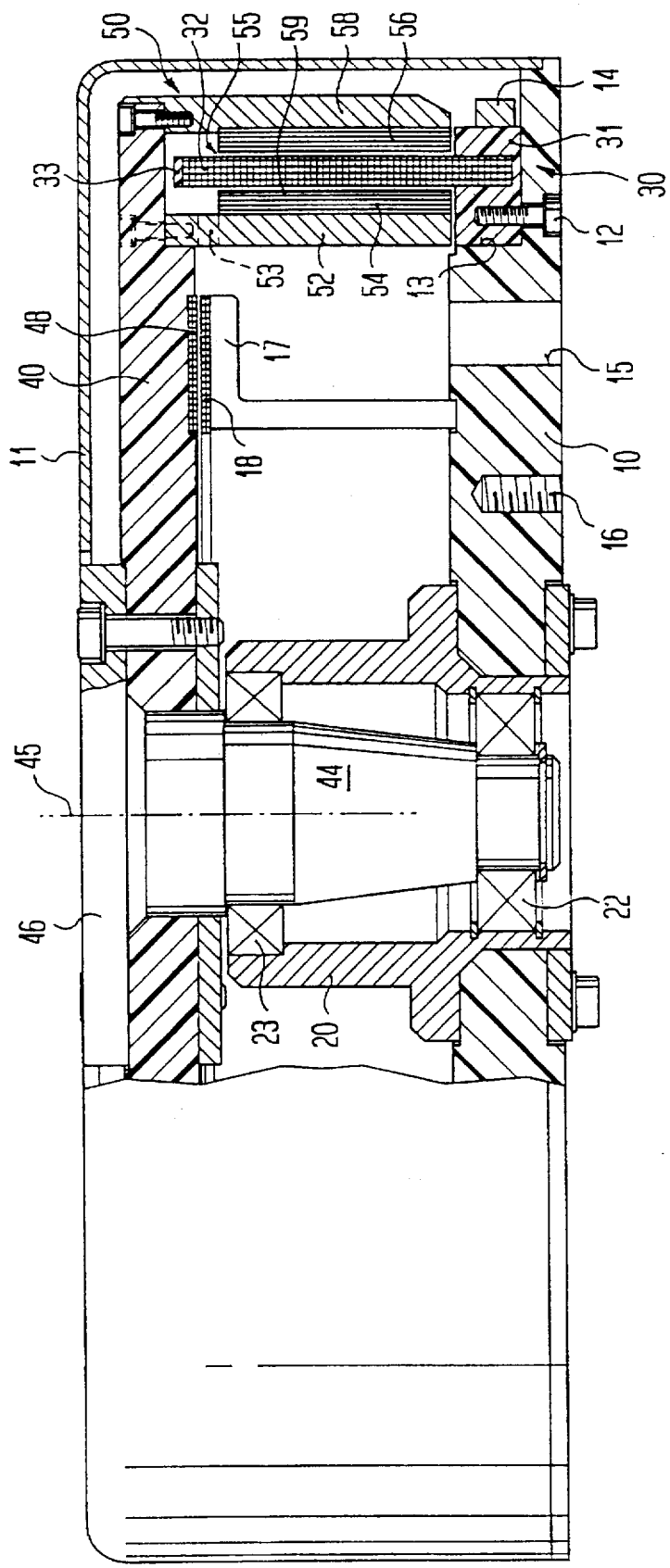
FIG. 1 is a schematic cross-sectional view—parallel to the rotational axis—of a DC motor according to the present invention.

FIG. 1 illustrates a DC motor according to the present invention comprising several components. These essential components include a motor supporting plate 10 including a bearing housing 20, and an annular stator means 30, further, a rotatably arranged rotor supporting plate 40 including a journal 44, a mounting flange 46 and a permanent magnet rotor 50. Both, the motor supporting plate 10 and the rotor supporting plate 40 comprise essentially the shape of a circular disk and being made of "Dehonit" (a wood material press-compacted with epoxy resin). A step 13 is recessed at the circumference of the motor supporting plate 10, and a foot portion 31 of the stator means 30 being inserted and fastened to said step 13. A further fastening and azimuthal alignment is effected by means of a clamping ring 14 and bolts 12 arranged in regular distances. A number of passing bores 15 being recessed within the motor supporting plate 10 and arranged in regular distances adjacent to the circumferential step 13, and cooling air may be introduced into the inner space of the motor through said bores 15. Further, the motor supporting plate 10 comprises internal screw threads 16 in order to fasten the motor to a—non shown—supporting means. Further, the motor supporting plate 10 comprises an inward extending ring having a bent flange 17, which extends nearly to the rotor supporting plate 40 and which supports the secondary winding 18 of a resolver. A primary winding 48 of the resolver being attached to the rotor supporting plate 40 oppositely to the secondary winding 18. A cylindrical bearing housing 20 being arranged and attached to the center of the motor supporting plate 10. Two motor bearings 22 and 23 being arranged at the inner circumferential face of the bearing housing 20 in an axially extending distance to each other. By means of said motor bearings 22, 23 a journal 44 being rotatably arranged, which is rigidly connected with a mounting flange 46 and with the rotor supporting plate 40. The journal 44 and along therewith the mounting flange 46 and the rotor supporting plate 40 including the permanent magnet rotor 50 rotate around the rotational axis 45. The journal 44 being secured against an axial displacement by means of pressure lock washers and driving lock washers. A driven shaft—non shown—may be fastened to the mounting flange 46. If required, an additional sound insulation hood or dome 11 may be provided, being supported at the circumference of the motor supporting plate 10 and comprising a center opening providing access to the mounting flange 46.

A vertically extending, bell-shaped permanent magnet rotor 40 being attached to the outer circumference of the rotor supporting plate 40, and consisting essentially of an inner ring 52 made of magnetically conductive material (iron, St 54) and of an outer ring 58 made of magnetically conductive material (iron, St 54) and of single one-piece permanent magnets made of Sm/Co magnet material. The inner permanent magnets 54 being attached by adhesive on an outer circumferential face of the inner ring 52. The outer permanent magnets 56 being attached by adhesive on an inner circumferential face of the outer ring 58. Gaps being provided between adjacent permanent magnets 54 and 56, respectively, and said gaps being filled preferably with cured resin in order to provide a slotless or grooveless surface. A magnetically active air gap 55 being located between the inner permanent magnets 54 and the outer permanent magnets 56, and the stator coil 32 including the crown portion 33 is extending into said air gap 55 like a plunger coil. Radially extending bores 53 being provided within the inner ring 52 adjacent to the rotor supporting plate 40 and arranged in regular distances, and cooling air may be passed out of the inner space of the motor through said bores 53 into the air gap 55 in order to eliminate the heat generated by the stator coil 32. A thin band 59 made of ultrastrength fibers and having a thickness of about 0.5 mm is engaging the outer circumference of the inner permanent magnets 54 in order to react against the tension forces, which will act upon the inner magnets 54 due to the centrifugal forces at high numbers of revolution.

Figure 2:
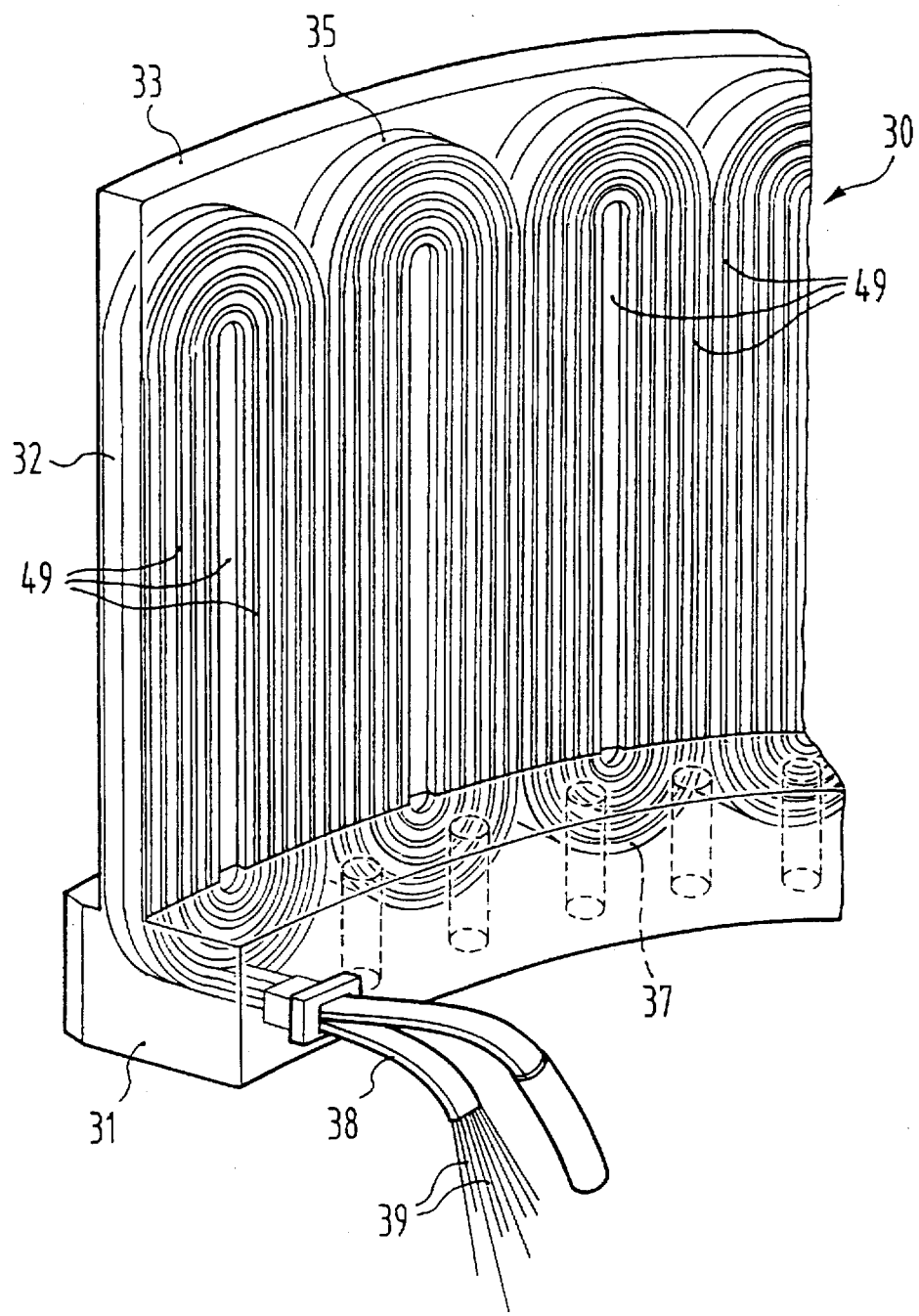
FIG. 2 is a perspective view of a part of a stator coil according to the present invention.

FIG. 2 illustrates a part of a stator means 30 according to the present invention. This stator means 30 comprises a stator coil 32, a foot portion 31 and a crown portion 33. The upper winding heads 35 are partially embedded into said crown portion 33. The lower winding heads 37 are partially embedded into the foot portion 31. Further, both, the crown portion 33 and the foot portion 31 consist of cured, glass fiber enforced resin. The stator coil 32 consists of cured structure resin and of a strand 38 wound into a specific form and comprises a large number of individually insulated filaments 39. The stator coil 32 comprises an inner circumferential face and an outer circumferential face, and axially extending grooves 49 being embossed into said faces. Said grooves 49 increase the surface, enhance the heat transmission at the boundary face and improve the efficiency of an air cooling.

Figure 3:
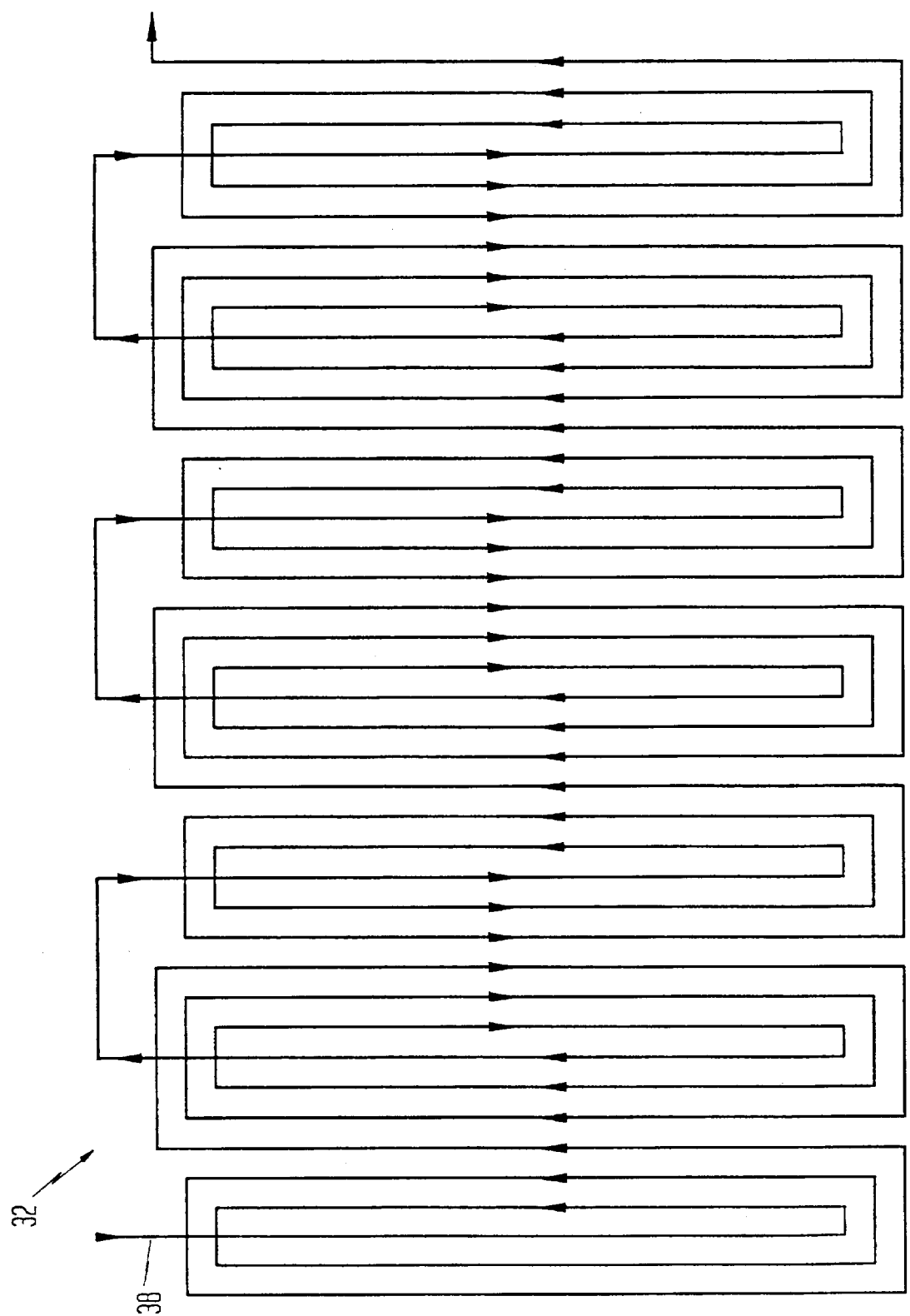
FIG. 3 represents a winding diagram for obtaining a pre-winding for a stator coil.

FIG. 3 illustrates in a schematic view a winding diagram for a strand 38 in order to obtain a stator coil 32. Alternatively, other types of winding diagrams may be used, for example a strict meander-like winding or such types of windings, wherein one electric pole comprises three or four adjacent coil portions.

Figure 4:
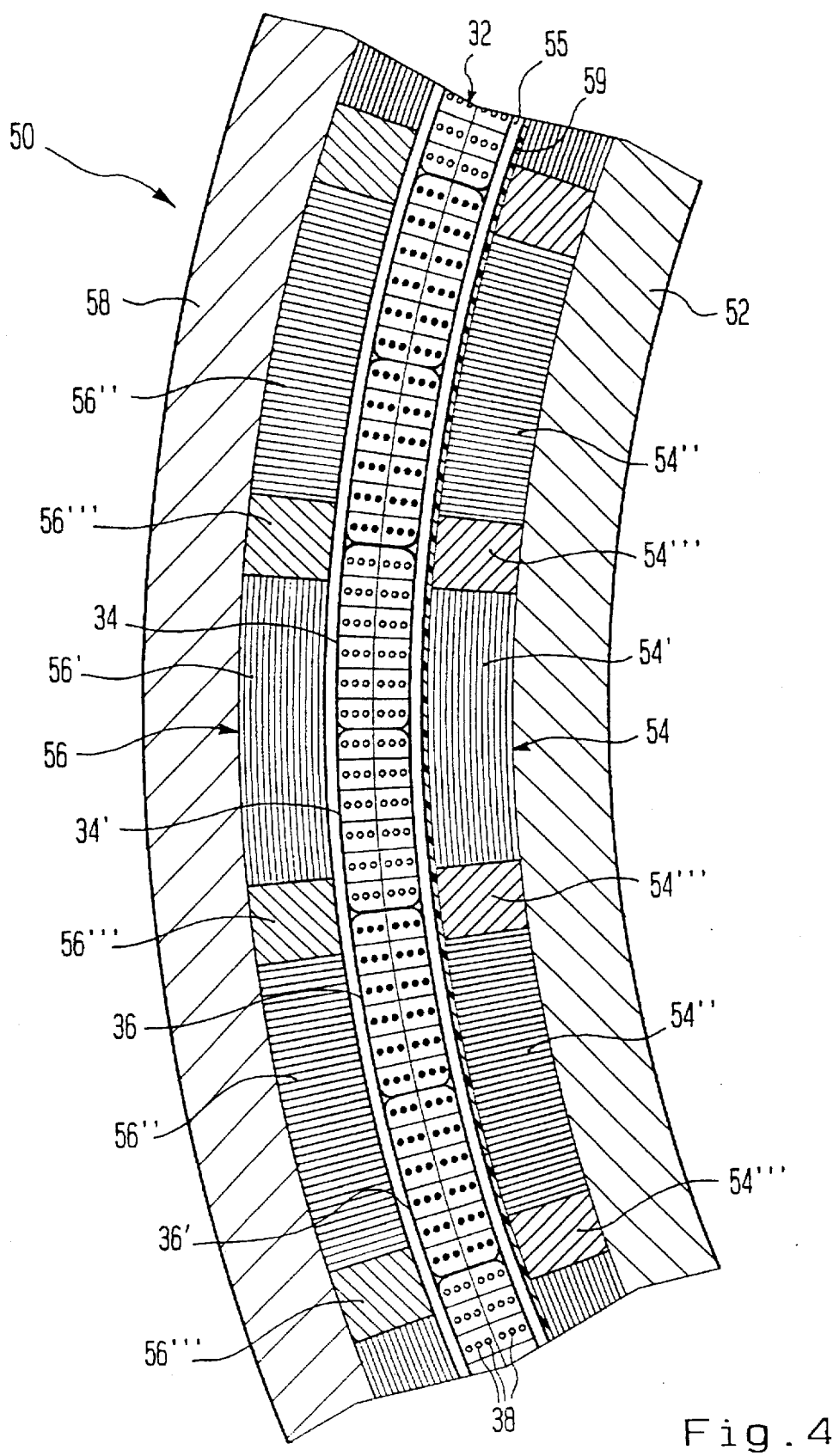
FIG. 4 is a cross-sectional view along the line 2—2 of FIG. 1, illustrating schematically and partially the magnetically active air gap and the arrangement of permanent magnet poles of the rotor with respect to the coil portions of the stator coil.

Referring to FIG. 4, the permanent magnet rotor 50 and the conditions within the air gap 55 will be explained in more detail. Both, the inner ring 52 and the outer ring 58 consist each of magnetic return circuit material, for example St 54. The permanent magnets 54, 56 form flat (thickness about 5 to 10 mm), essentially rectangular pieces, comprising main faces, being matched to the circumference of the air gap 55. These permanent magnets 54, 56 being magnetized vertically to their main faces. Alternating magnetic North 54' and magnetic South 54" being arranged at the outer circumferential face of the inner ring 52. Magnetic North 54' and magnetic South 54" being separated from each other by a neutral zone 54'". In a similar manner, alternating magnetic North 56' and magnetic South 56" being arranged at the inner circumferential face of the outer ring 58, and neutral zones 56'" being arranged between magnetic North 56' and magnetic South 56". The permanent magnets being formed and arranged in such a manner that the neutral zones 52'" and 56'" extend radially and in alignment which each other. Radially aligning arranged permanent magnet poles comprise the same polarity. Preferably, the width (dimension in circumferential direction) of the neutral zones 54'", 56'" corresponds essentially to the radial dimension of the air gap 55. This provides an essentially homogeneous magnetic field comprising straight radially extending field lines in a continuously alternating polarity. The pole pitch of the permanent magnets 54, 56 is defined by the traverse pole width and by the width of the neutral zones 54'", 56'" (dimension in circumferential direction); in the present case, said pole pitch is constant and of single-phase.

Further, as illustrated with FIG. 4, a stator coil 32, formed like a compact, dense, press-compacted flat coil is located within the magnetically active air gap 55. This stator coil 32 consists of straight coil portions 34, 34' and 36, 36', engaging each other in circumferential direction. The points shall schematically express that the coil portions 34, 34' extend in axial direction in a first direction; accordingly, the circles shall express that the coil portions 36, 36' extend in axial direction in a second direction, opposite to the first direction (additional reference is made to the winding diagram according to FIG. 3). All these coil portions 34, 34', 36, 36' comprise the same transverse width corresponding essentially to the half pole width of the permanent magnet poles 54, 56. At a given time moment, the electric current will flow through a couple of two adjacent coil portions 34 and 34' or 36 and 36' in the same direction, such that said two adjacent coil portions 34 and 34' will form one electric pole, and the adjacent two coil portions 36 and 36' will form another electric pole having the opposite polarity. Further, these couples of two adjacent coil portions 34, 34' and 36, 36' comprise a pole pitch, which is equal with the pole pitch of the permanent magnets 54, 56. Each coil portion 34, 34', 36, 36' comprises a number of strands 38. Each strand 38 comprises a rectangular cross-sectional area and is consisting of a large number of single individually insulated filaments 39. According to the given presentation with FIG. 4, each coil portion 34, 34', 36, 36' is consisting of twelve strand portions 38, being arranged in two layers, wherein each layer comprises six strand portions. Each strand portion 38 comprises a longer side of its cross-sectional area, and said longer side being arranged parallel to the direction of the magnetic field lines within the air gap 55.

An exemplary DC motor according to the present invention has been assembled comprising essentially the construction and design as explained with reference to FIGS. 1 to 4. The motor comprises 60 permanent magnet poles having pole dimensions of 50×25×7 mm and being arranged in an inner ring 52 and an outer ring 58; these permanent magnet poles being made of Sm/Co magnetic material. The pole pitch at the circumference amounts 28.3 mm. 88% of the circumferential face being covered with magnetic material. The stator coil comprises a compact, dense, press-compacted flat coil consisting of strands comprising thin Cu wires and being filled and stabilized by a cured structure resin, for example an epoxy resin termed "Duralco 4460" and being commercially available from the company "Cotronics"; said resin comprises high creep capability and high temperature resistance. The copper strand has a cross-sectional area of about 3.9 mm² and comprises within this cross-sectional area about 115 filaments, being arranged twisted around the strand length axis and being individually insulated (insulating material: Polyimid, class H). The cured stator coil has a thickness of about 6 mm and comprises 27 electric poles at the circumference having a pole pitch of 28.3 mm; in addition there is a piece used for phase displacement. The coil portions (34, 34', 36, 36') comprise a free length of 63 mm and an active length of 50 mm.

A suited and adapted current inverter being used for the current supply of this motor. The following parameters have been measured with this motor and with the operation of this motor:

residual induction: 1.0 Tesla maximum air gap induction: 0.64 Tesla within the stator coil per phase induced voltage voltage$_{ind}$: 0.034 V$_{eff}$ (rpm)

voltage$_{ind}$: 0.048 V$_{sp}$ (rpm)

voltage$_{ind}$ (3200 rpm): 109 V$_{eff}$ motor at 3200 rpm voltage: 3×220 V$_{eff}$ permanent current: 110 Ampere$_{eff}$ peak current (during 5 min): 124 Ampere$_{eff}$ permanent power rating: 21 kW peak power rating (during 5 min): 27 kW The following characteristics and features have been measured with this DC motor:

a) The power rating of the motor in dependence of the numbers of revolution.

Figure 5:
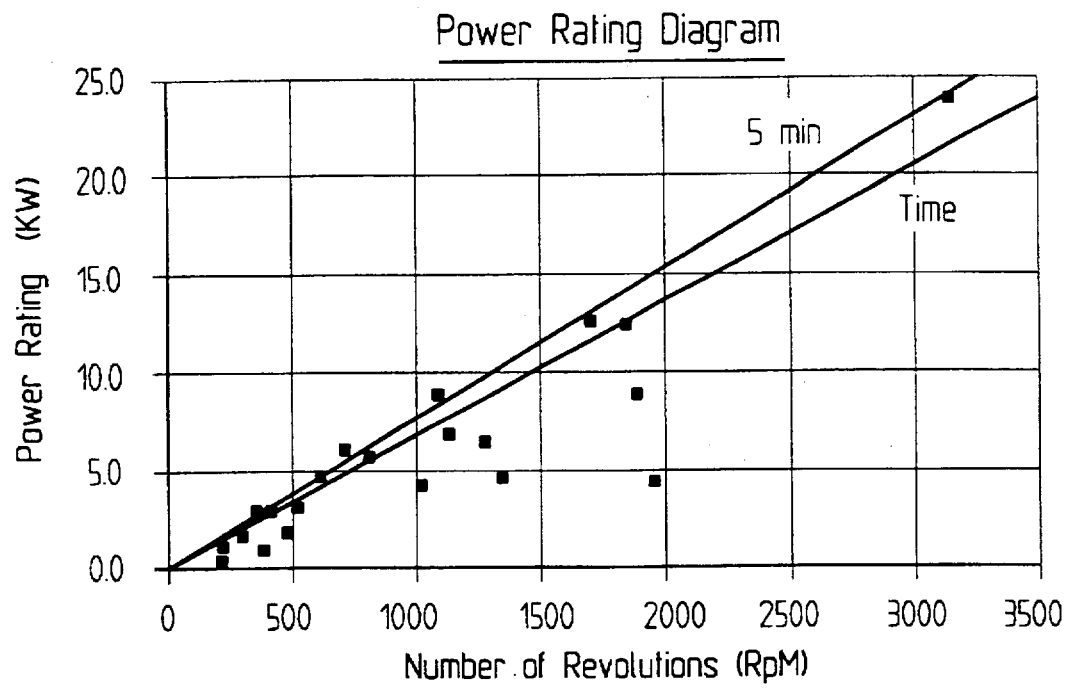
FIG. 5 illustrates by means of a graph the power rating in dependence of the numbers of revolutions in an exemplary motor according to FIGS. 1 and 4.

The results obtained are shown with FIG. 5. The recorded points represent measured values. Both, the characteristic line for a 5 min operation and for a continuous operation have been stated for a stator coil temperature of 150° C. The structure resin and the filament insulation material allow a continuous temperature of 180° C.

b) The running-up times of the motor in a free-running mode.

Figure 6:
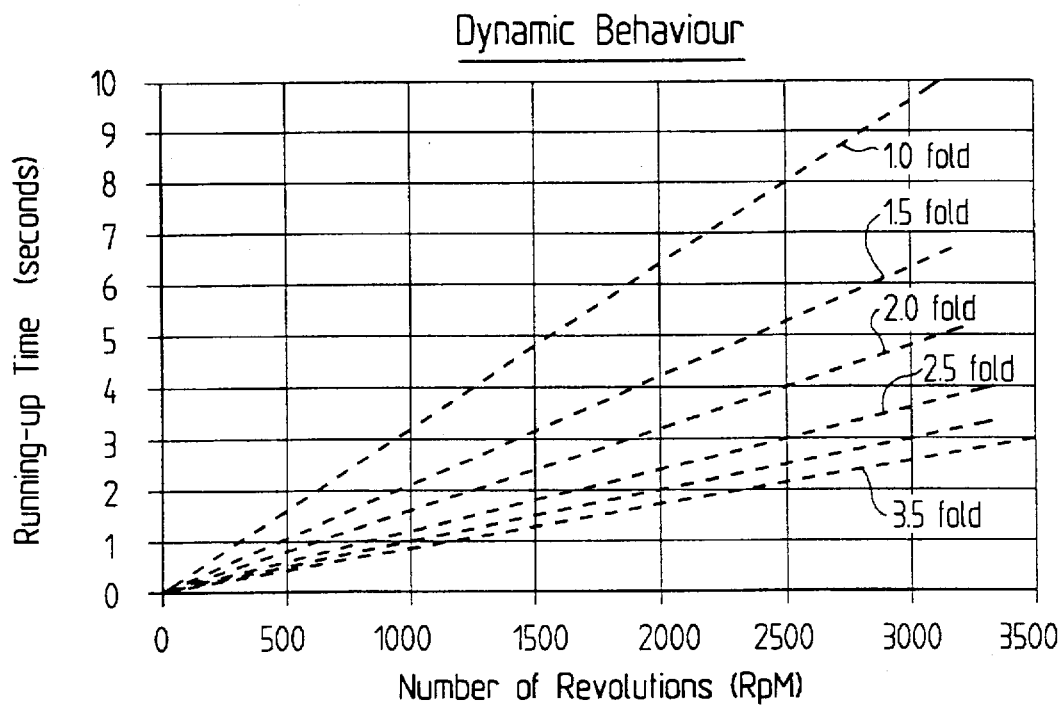
FIG. 6 illustrates by means of a graph the run-up times of a free-rotating motor according to FIGS. 1 and 4 in dependence of differently supplied voltages/currents.

The results obtained have been shown with FIG. 6. Obviously, the motor is characterized by a highly dynamic behaviour which is especially important for robot drives, for main drives of processing and machining machines and especially valuable for vehicle drives requiring a dynamic reaction to several functions such as ABS and ASR systems. The high dynamic in comparison to conventional drives is due to the fact that the mechanical force being generated at the outer circumference of the motor and that the permanent magnets provide the necessary excitation or energizing at a much lower weight than comparable electric components. The iron-less construction of the stator allows an extreme overload capacity of the motor, which is essentially limited by the thermal behaviour and not by the dimensions of the magnetic circles, in contradiction to conventional machines, which would turn over to the state of saturation.

c) The specific torque.

Figure 7A:
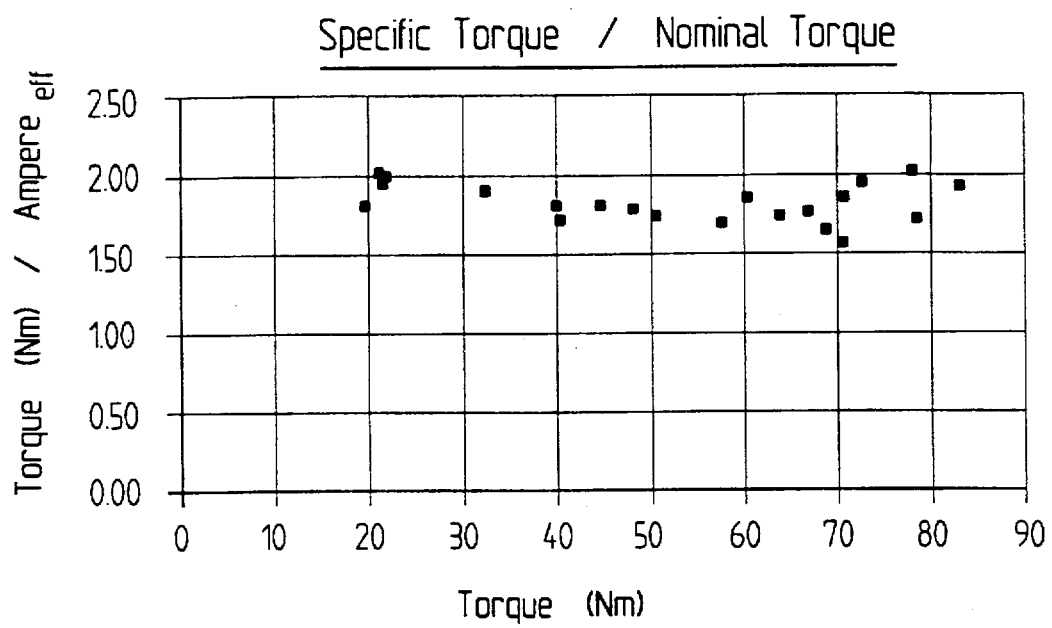
FIGS. 7a and 7b illustrate by means of a graph the specific torque in dependence of the nominal torque (FIG. 7a) and in dependence of the rotational speed (FIG. 7b) in an exemplary motor according to FIGS. 1 and 4.
Figure 7B:
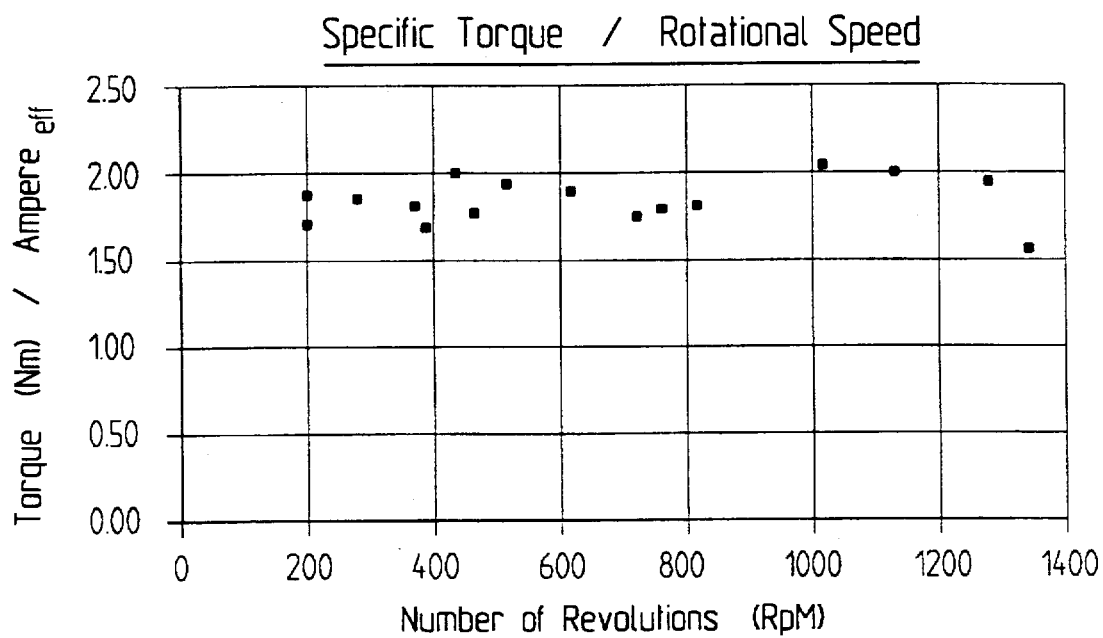

The results obtained in dependence of the nominal torque are shown with FIG. 7a; and the results obtained in dependence of the number of revolutions are shown with FIG. 7b.

Both diagrams show that the behaviour of the motor is essentially linear with the current supplied. This means, there are no extraordinary losses, for example losses due to eddy currents or due to saturation losses, which are caused by a dependency of the number of revolutions or of the nominal torque. This means, the overload capacity of the motor is exclusively limitated by thermal factors.

d) The thermal behaviour under air cooling and with a loading of nominal current (I=120 Ampere).

Figure 8:
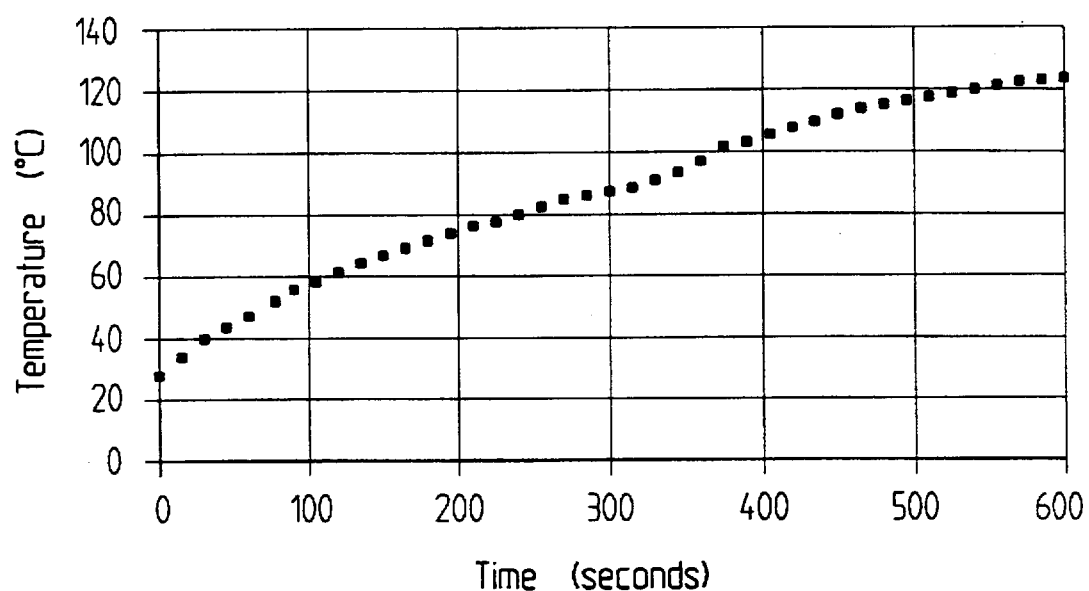
FIG. 8 illustrates by means of a graph the thermal behaviour by air cooling of an exemplary motor according to FIGS. 1 and 4.

The results obtained are shown with FIG. 8.

With this kind of a stator coil formed like a compact, dense, thin, press-compacted flat coil made of a strand having very thin copper conductors and filled and stabilized with a cured structure resin and comprising grooves at the surface in order to improve the cooling efficiency, it is demonstrated that the cooling function is mainly provided by the heat transfer from the coil body to the surrounding air. With a cooling air flow velocity of about 7 m/sec about 90% of the temperature gradient is caused by the heat transfer at the surface, and only about 10% of the temperature gradient is caused by the heat conduction within the internal body of the stator coil. Despite the very high current density of about 10 Ampere/mm² in the stator coil, a cooling of the motor by cooling air is completely sufficient and is not sensitive with respect to short-time overload conditions, because even without any cooling the motor comprises a thermal time constant of about 4 minutes.

e) The degree of efficiency of the motor.

Figure 9A:
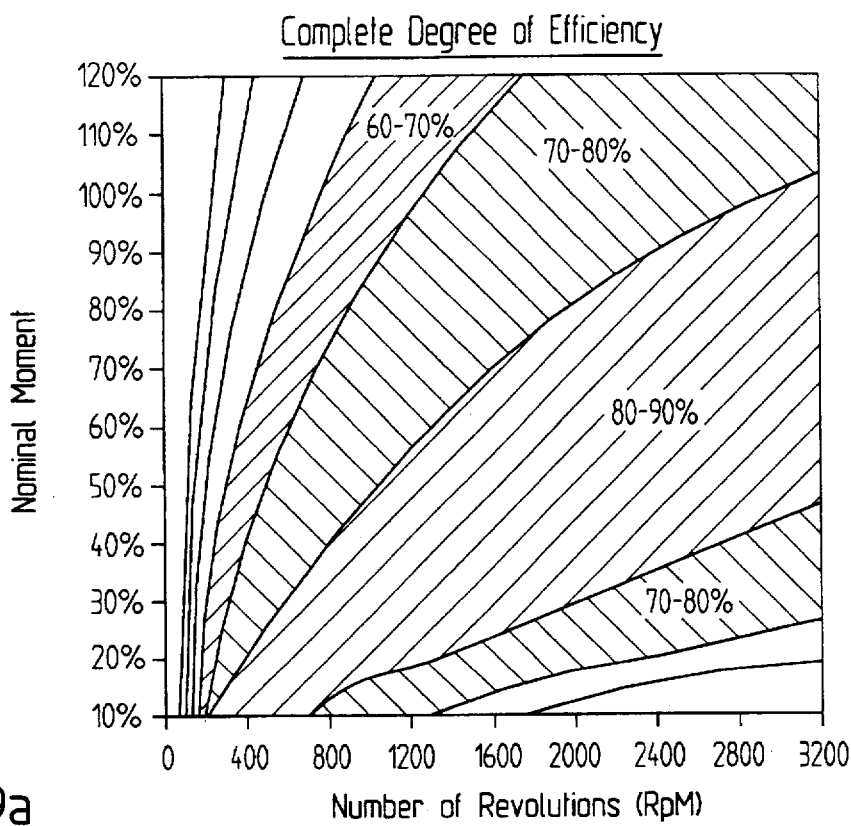
FIGS. 9a and 9b illustrate by means of a contour line diagram the whole efficiency (FIG. 9a) and the efficiency without delivery losses (FIG. 9b) in an exemplary motor according to FIGS. 1 and 4.
Figure 9B:
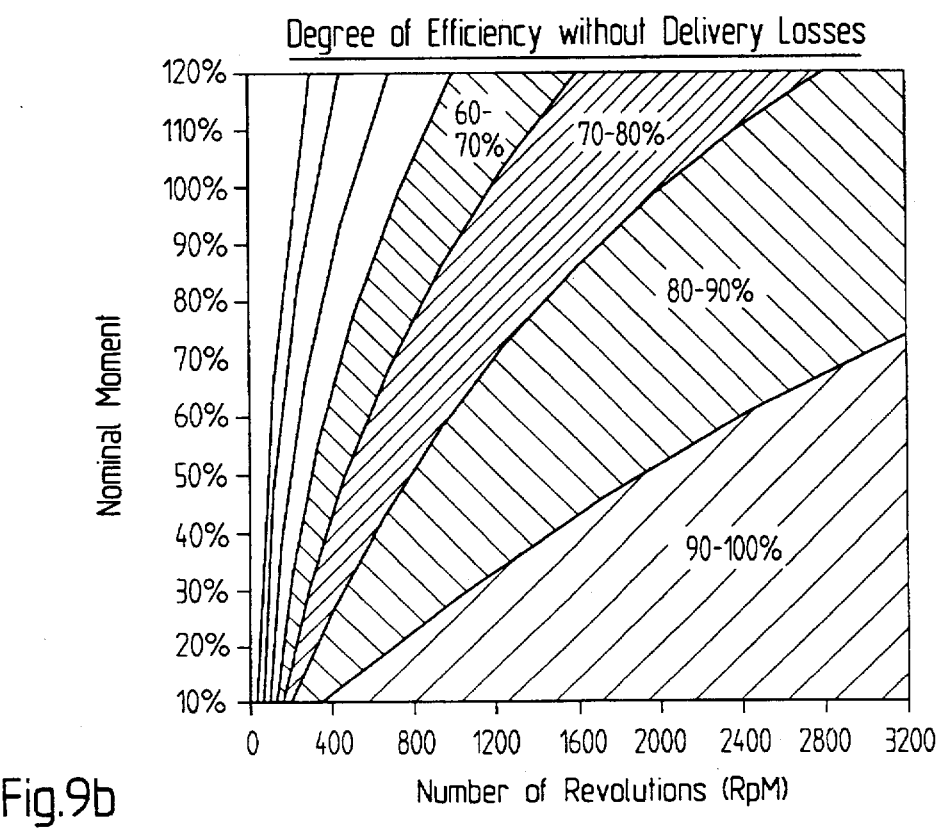

The results obtained are shown in two contour line diagrams; FIG. 9a illustrates the complete degree of efficiency; and FIG. 9b illustrates the degree of efficiency without considering the delivery losses.

With this kind of a contour line diagram the efficiency is shown as marks in dependence of the torque (plotted along the abscissa) and in dependence of the torque (plotted along the ordinate). The characteristic curves between the marks represent curves of constant efficiency. FIG. 9a illustrates the measured (complete) degree of efficiency. This measured degree of efficiency includes all kinds of losses, such as Ohmic losses, losses within the permanent magnets, air friction, bearing friction and, if provided, losses by insulation problems within the strand. FIG. 9b illustrates the characteristics of the electromagnetic efficiency of the motor without considering the losses caused by the specific constructive embodiment.

In comparison with the motor of the prior art, especially with a DC motor disclosed with U.S. Pat. No. 5,331,244, comprising an essentially similar permanent magnet rotor, but having a stator coil formed as a solid bar winding, a stator coil according to the present invention decreases the delivery losses to an amount of at least 80%. Just the present invention makes this motor concept available as a driving motor for vehicles, especially for passenger cars. In addition, the measured and stated data do by no means exhauste the engineering potential of this motor concept. It is assumed to double the motor power rating and to lower the relative losses of the motor till about 25% by increasing the active length of the permanent magnets and of the coil portions to about 100 mm and maintaining the same rotor diameter of about 300 min. In addition it looks not unreasonable to increase the number of revolution to about 6000 to 7500 rpm with a motor of the present dimensions. Therefore, it looks not un-realistic to obtain power ratings of 100 kW and more with this motor concept comprising a rotor diameter of about 250 to 300 mm and comprising an axial length or height of about 150 mm.

We claim:

1. An electrically commutated DC machine comprising:
   a permanent magnet rotor supported on a rotational axis; having an even number of permanent magnet poles, arranged in a constant pole pitch for rotating along a cylindrical air gap,
   generating within said air gap a homogeneous magnetic field with linear and radially extending magnetic field lines with a continuously changing polarity,
   an iron-free stator means including a self-supporting stator coil of conductor material comprised of one or more several strand(s), wherein each strand comprises a number of twisted thin filaments individually isolated, having a diameter equal or less than 0.4 mm, and a cured synthetic resin, said conductor material and cured resin being compacted to provide a stator coil having a content of conductor material of from 70 to 90% by volume to form straight coil portions parallel to the rotational axis and extending within the air gap wherein each coil portion comprises only one distinctive current direction at a given moment, and wherein each coil portion has a width corresponding to the pole pitch of the permanent magnet rotor.

2. A DC machine according to claim 1,
   wherein said permanent magnet rotor is in the shape of an open bell type armature comprising a plate and an inner ring and an outer ring extending from said plate and concentric to the inner ring;
   the inner ring and the outer ring being made of a magnetically conductive material for closing a magnetic flux circle and forming permanent magnetic poles, poles of said inner ring forming an air gap with poles of said outer ring, the permanent magnet poles on the inner ring and the permanent magnet poles on the outer ring being arranged in alignment and being polarized radially with the same polarity;
   adjacent permanent magnet poles on the inner ring and adjacent permanent poles on the outer ring being alternatively polarized.

3. A DC machine according to claim 1,
   wherein the strand comprises substantially 10 to 50 filaments per 1 $mm^2$ cross-sectional area.

4. A DC machine according to claim 1,
   wherein the stator coil comprises a compact, dense flat coil forming a one-piece closed ring of several segments,
   wherein at least the straight coil portions of said ring is introduced axially into said air gap.

5. A DC machine according to claim 1,
   wherein the stator coil is formed as a plunger coil clamped at one end and extending into the air gap, wherein said air gap is defined at one side by rotatably arranged permanent poles, and defined at the other opposite side by material for closing a magnetic flux circle.

6. A DC machine according to claim 5,
   wherein the air gap comprises an inner circumferential face, and the material defining said inner circumferential face comprises an stationary iron material selected from an iron material which minimizes eddy currents.

7. A DC machine according to claim 1,
   including means for providing a forced flow of cooling air into the air gap along the circumferential faces of the stator coil.

8. A DC machine according to claim 1,
   wherein the permanent magnet rotor comprises one or more circumferential face(s) defining the air gap; and said face(s) being free of slots, grooves and recesses.

9. A DC machine according to claim 1,
   wherein the stator coil comprises a radially extending thickness of about 5 to 10 mm.

10. A DC machine according to claim 1,
    wherein the stator coil comprises several coil portions, and each coil portion comprising several strand portions;
    wherein each strand portion comprises one or more stand(s) having a rectangular cross-sectional area; and
    the strand is arranged within the air gap in such a manner that the longer side of the strand cross-sectional area is arranged parallel to the magnetic field lines within the air gap.

11. A DC machine according to claim 1,
    wherein the coil portions comprise a traverse width essentially equal to the half pole width of the permanent magnet poles; and
    electrical current flows through two adjacent coil portions in the same direction such that said two adjacent coil portions form one electric pole.

12. A DC machine according to claim 1,
    wherein the coil portions extend into the air gap with an axially extending length from 50 to 100 mm.

13. A DC machine according to claim 1,
    wherein coil portions are connected with each other in tandem via an upper winding head or via a lower winding head;
    the upper winding heads extend within an imaginary extension of the coil portions such that the completely assembled stator coil may be introduced axially into the cylindrical air gap of a permanent magnet rotor.

14. A DC machine according to claim 13,
    wherein the upper winding heads are embedded with a crown portion made of fiber enforced resin.

15. A DC machine according to claim 14,
    wherein the crown portion includes a band made of ultra strength fibers.

16. A DC machine according to claim 12,
    wherein the lower winding heads are embedded with a foot portion made of fiber enforced resin; and
    the stator means are attached to and are centered with a motor supporting plate by means of said foot portion.

17. A DC machine according to claim 1,
    wherein a number of coil portions form a first coil segment and a second coil segment, each segment comprising a constant pole pitch and forming a distinctive electric phase phase displaced with respect to each other.

18. A DC machine according to claim 17, wherein the stator means comprises a first, a second and a third coil segment, each having circumferential extension of about 120°;

the second coil segment and third coil segment being phase displaced in opposite directions 2/3 of the pole pitch with respect to said first coil segment.

19. A DC machine according to claim 17, operated in a motor mode by means of electric current provided by an inverter means for each single electric phase of the stator means.

20. A DC machine according to claim 19, wherein the electric current being supplied by one or more inverter means having a sinus-like shape which is matched to the voltage being induced within the stator coil by the rotating permanent magnets.

21. A DC machine according to claim 1, comprising a means for detecting the pole position of the permanent magnet poles of the rotor signals for controlling the current supply of the stator coil comprising a resolver having a primary winding which rotates synchronously with the permanent magnet rotor.

22. A DC machine according to claim 2, wherein the inner ring and the outer ring have an axially extending length in a range of 50 to 100 mm.

23. A DC machine according to claim 2, wherein each permanent magnet pole comprises one or more thin, axially extending slots such that each pole is divided into a number of bars for reducing eddy currents.

24. A DC machine according to claim 2, wherein the permanent magnet poles on the inner ring are secured with a thin band made of ultra strength fibers such as to provide a protection against tensile forces due to centrifugal forces generated at a high rotational speed.

25. A DC machine according to claim 2, wherein the stator coil comprises a dense flat coil forming a ring;

the ring having an outer circumferential face and an inner circumferential face, at least one of said circumferential faces having axially extending embossed grooves.

* * * * *